United States Patent
Hua

(12) 
(10) Patent No.: US 6,371,161 B1
(45) Date of Patent: Apr. 16, 2002

(54) APPARATUS FOR CONSERVING THERMAL ENERGY IN A CENTRAL HEATING SYSTEM

(75) Inventor: Li Shan Hua, Ji Lin (CN)

(73) Assignee: Zuhai Velocity of Sound Technology Limited (CN)

( * ) Notice: Subject to any disclaimer, the term of this patent is extended or adjusted under 35 U.S.C. 154(b) by 0 days.

(21) Appl. No.: 09/729,831

(22) Filed: Dec. 6, 2000

(30) Foreign Application Priority Data

Dec. 10, 1999 (CN) ....................................... 99241051 U

(51) Int. Cl.[7] ............................................... G05D 11/16
(52) U.S. Cl. ........................................ 137/597; 137/888
(58) Field of Search .................................. 137/597, 888

(56) References Cited

U.S. PATENT DOCUMENTS 1,195,915 A * 8/1916 Damrow ................. 137/888 X
2,694,404 A * 11/1954 Luft et al. ..................... 137/1

* cited by examiner

Primary Examiner—Kevin Lee
(74) Attorney, Agent, or Firm—Blank Rome Comisky & McCauley, LLP

(57) ABSTRACT

An energy saving heat transfer unit providing an efficient means to transfer energy from steam to water in a central heating system. The steam enters a mixing chamber and creates a negative pressure environment. Water in a backwater pipe, which is at a lower temperature and pressure, is than is absorbed into the mixing chamber where energy is passed from the steam to the water. A by-pass outlet is provided which relieves the heat transfer unit of excess pressure which may build up. The heated water then exits the heat transfer unit and goes back into the central heating system. After being cooled in the central heating system, the water then reenters the heat transfer unit at the backwater pipe and continues the cycle over again.

6 Claims, 1 Drawing Sheet

APPARATUS FOR CONSERVING THERMAL ENERGY IN A CENTRAL HEATING SYSTEM

BACKGROUND OF THE INVENTION

FIELD OF THE INVENTION

This invention is a heating equipment, to be specific, it is a supersonic 4-way bypass decompressing super energy-saving unit.

SUMMARY OF THE INVENTION

Ordinary central heating system realizes central heating supply to users by making use of circulating pump to keep the water in a user system circulated continuously and at the same time heating the circulating water with steam through thermal converter. The water in such system is indirectly heated by a thermal source of steam, thus the thermal efficiency is relatively low. Particularly, the other half of energy in the steam, kinetic energy (pressure of steam), is wasted in the system.

This invention is designed to solve the above problem by providing a super energy-saving unit with supersonic 4-way bypass decompression.

The feature of this super unit is composed of a flange at the steam inlet, a flange at the backwater intake, a flange at the water exit, a flange at the bypass water outlet and a main body. The flange at the steam inlet is connected with the body. Close to the inlet flange inside the body there is a nozzle with a critical jet at its tip. Close to the jet there is a mixing chamber which is linked with a mixing tube to a diffusion cubicle. The cubicle is connected with, the water exit flange. On the sides of the cubicle there are bypass openings that link bypass water outlet flanges. The backwater intake flange is connected with the body at the nozzle.

Both nozzle and mixing chamber are funnel like and critical jet is trumpet shaped while mixing tube is a circular tube and diffusion cubicle is in an expanded bell shape. This invention is a heating and compressing unit powered by steam. The steam with certain pressure ejects from the jet at a very high speed and comes into the mixing chamber. Meanwhile, the pressure is reduced at the exit of the jet, producing a negative pressure, with which the water at low temperature and pressure from backwater pipe is absorbed into the chamber. Exchange of heat and momentum between the two flows is carried out in the chamber, namely, steam passes heat to backwater to increase water temperature and passes momentum and energy to backwater to increase pressure and potential energy. When leaving the mixing chamber the mixed flow has become hotter water at a uniform speed before entering into diffusion cubicle, to reduce its flow gradually while rise its pressure continuously. As result, hotter water with certain pressure and temperature is obtained. Under the action of pressure hot water comes to the thermal circulation system from water exit for heat supply, and then enters into this energy-saving unit from backwater intake and continues circulation and heat supply after water temperature drops.

The bypass water outlet flanges start to work and shunt a part of pressure so as to ensure the normal operation of the system when the pressure exceeds the threshold the system can bear. Thanks to direct contact of thermal source of steam and the water to be heated the thermal efficiency is improved, especially, the system makes full use of another half of the energy-kinetic energy (steam pressure), directly converting, it into the pressure to drive the heated water continue its self-circulation. As a result of the advanced function circulating pump is saved as well as the fund.

BRIEF DESCRIPTION OF THE DRAWING

The FIGURE is a sectional view of this invention structure.

DETAILED DESCRIPTION OF THE INVENTION

Figure 1:
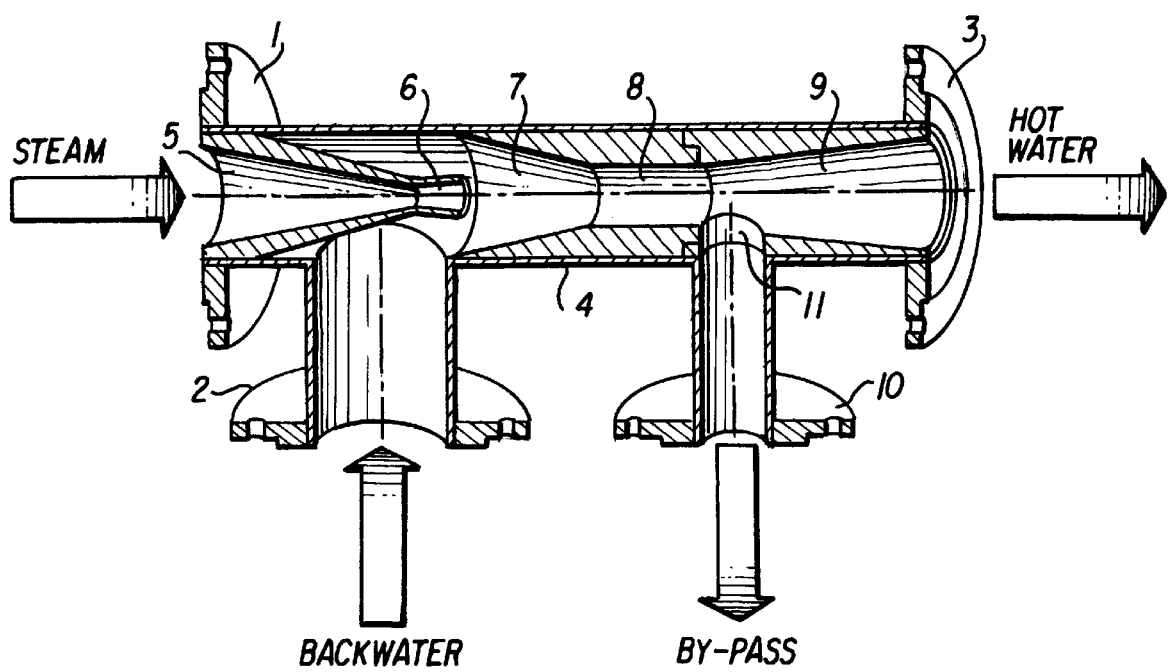

As shown in the FIGURE are steam inlet flange 1, backwater intake flange 2, water exit flange 3, the main body 4, funnel-shaped jet 5, trumpet-like critical nozzle 6, funnel-shaped mixing chamber 7, circular mixing tube 8, expanded bell-shaped diffusion cubicle 9, bypass water exit flange 10, and bypass opening 11.

This supersonic 4-way decompressing super energy-saving system is composed of a flange at the steam inlet 1, a flange at the backwater intake 2, a flange at the water exit 3, and main body 4. The flange at the steam inlet 1 is connected with the body 4. Close to the steam inlet flange 1 inside the body 4 there is a funnel-shaped nozzle with a critical jet 5 at its tip. Close to the jet there is a funnel-like mixing chamber 7 which is linked with a circular mixing tube 8 to an expanded bell-like diffusion cubicle 9. The cubicle 9 is connected with the water exit flange 3. On the sides of the cubicle there are bypass openings that link bypass water outlet flanges 10. The backwater intake flange 2 is connected with the body 4 at the funnel-shaped nozzle 5.

This unit is expected to be widely used in thermal and heated water supply system both in industrial and civil buildings and it is fully possible to replace the traditional thermal converters and circulating pumps.

In the mixing process of steam and water inside the body of the invention system the mixed fluid can reach a supersonic speed due to the increase of compression coefficient and both fluids shall not consume mechanic energy in the transmission process of thermal energy and kinetic energy. Heating and compressing is carried out instantaneously, finally, realizing the purpose of fluid heating and compressing.

What is claimed is:

1. A supersonic 4-way bypass decompressing super energy-saving unit comprising:
   a main body having a steam inlet, a backwater intake, a bypass opening, and a water exit;
   a nozzle with a critical jet at its tip located inside the body proximate to the steam inlet, a mixing chamber located adjacent to the jet, a mixing tube located adjacent to the mixing chamber, and a diffusion cubicle located adjacent to the mixing tube, the diffusion cubicle having the bypass opening located on its side; and
   a steam inlet flange connected to the main body and adjacent to the steam inlet, a backwater intake flange connected to the body at the nozzle, a water exit flange connected to the body adjacent to the diffusion cubicle, and a bypass flange connected to the bypass opening.

2. As claim 1 described the supersonic 4-way bypass decompressing super energy-saving unit is featured with a funnel-shaped nozzle.

3. As claim 1 described the supersonic 4-way bypass decompressing super energy-saving unit is featured with a trumpet like critical jet.

4. As claim 1 described the supersonic 4-way bypass decompressing super energy-saving unit is featured with a funnel-shaped mixing chamber.

5. As claim 1 described the supersonic 4-way bypass decompressing super energy-saving unit is featured with a circular mixing tube.

6. As claim 1 described the supersonic 4-way bypass decompressing super energy-saving unit is featured with an expanded bell-shaped diffusion cubicle.

* * * * *

UNITED STATES PATENT AND TRADEMARK OFFICE
CERTIFICATE OF CORRECTION

PATENT NO.   : 6,371,161 B1  
DATED        : April 16, 2002  
INVENTOR(S)  : Li Shan Hua It is certified that error appears in the above-identified patent and that said Letters Patent is hereby corrected as shown below:

<u>Title page,</u>
Item [73], Assignee: "Zuhai" should read -- Zhuhai --.

Signed and Sealed this

Twenty-ninth Day of October, 2002

*Attest:*

*Attesting Officer*

JAMES E. ROGAN
*Director of the United States Patent and Trademark Office*